Patented June 4, 1940

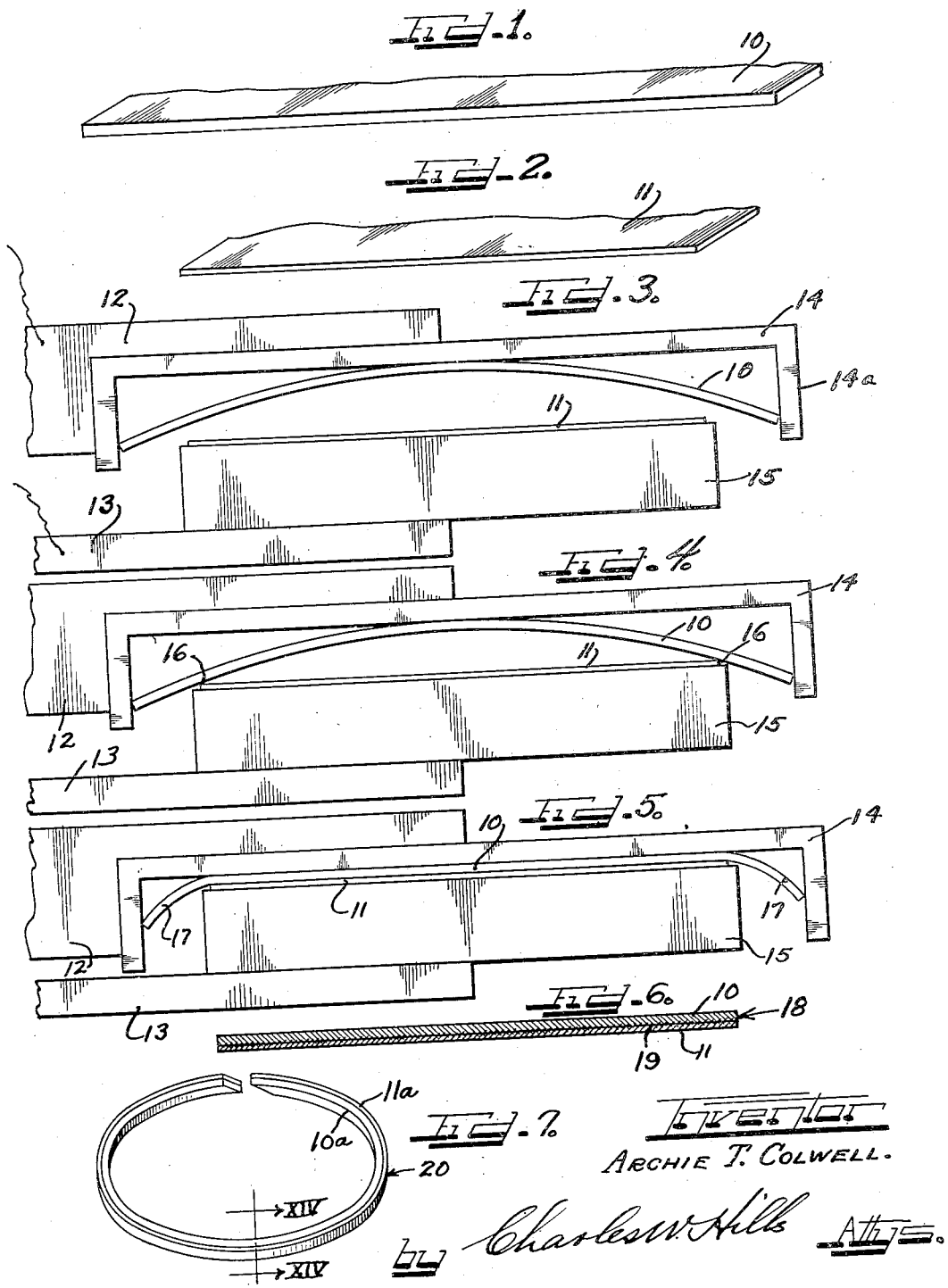

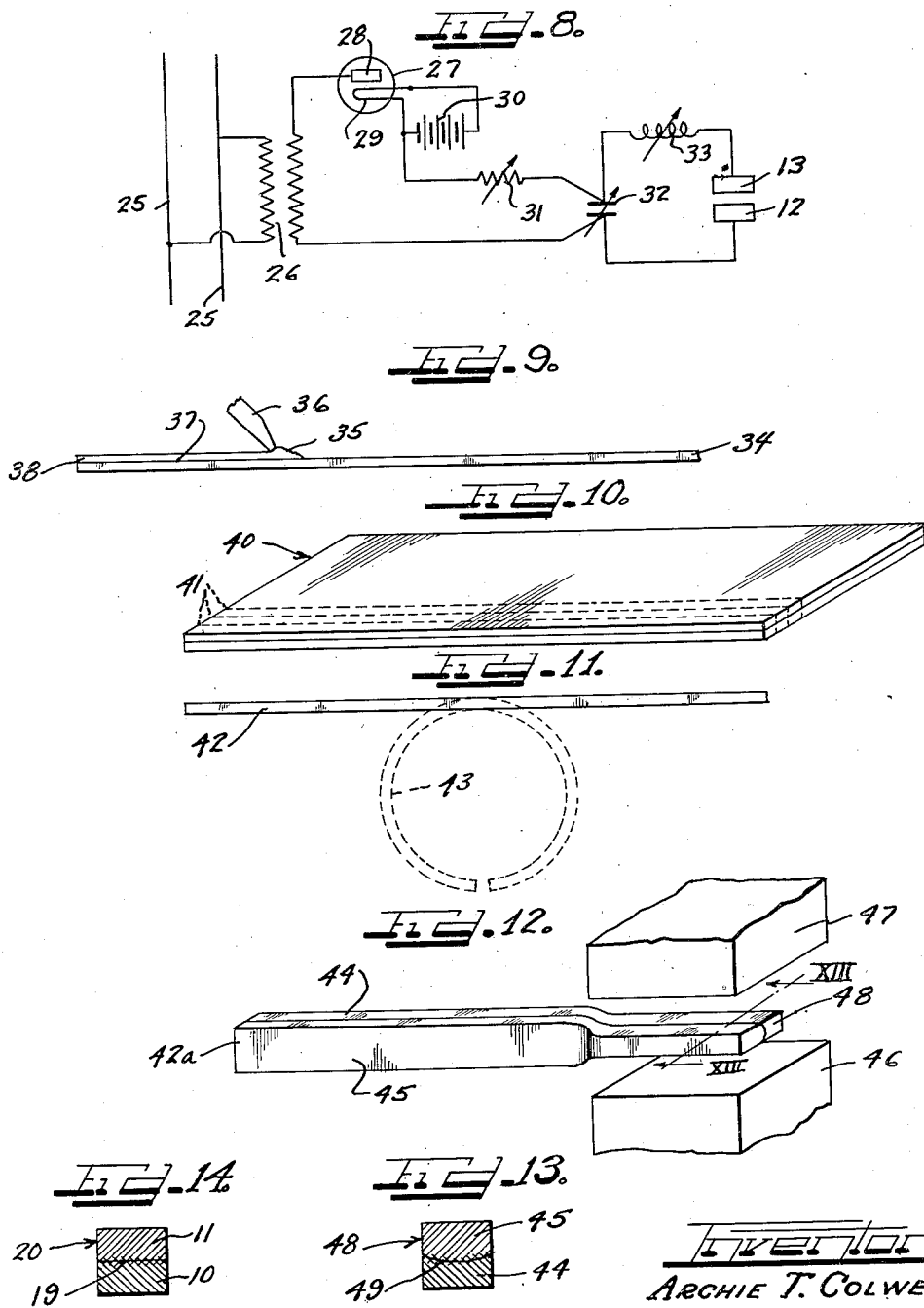

2,202,899

UNITED STATES PATENT OFFICE 2,202,899

PISTON RING AND METHOD OF MAKING SAME

Archie T. Colwell, Cleveland, Ohio, assignor to Thompson Products Incorporated, Cleveland, Ohio, a corporation of Ohio Application March 18, 1938, Serial No. 196,631

6 Claims. (Cl. 29—156.6)

This invention relates to a packing ring for pistons, and especially pistons of internal combustion engines. More particularly this invention relates to a piston ring having a non-ferrous alloy bearing face for engaging the wall of the cylinder in which the piston is mounted.

It has heretofore been proposed to coat piston rings with metals to provide cylinder engaging surfaces thereon. These surfaces have generally been formed either by electroplating or by dipping operations. The coatings are usually of relatively soft metals and are of negligible thickness as compared with the thickness of the piston ring body. Such thin coatings wear away rapidly, and furthermore cannot present sufficient volume for the absorption of appreciable amounts of oil or other lubricant to render the surfaces self-lubricating.

According to this invention, a piston ring is provided with an oil-absorbent alloy layer of appreciable thickness, which is integrally and permanently united to the piston ring foundation metal by a welding or brazing operation.

According to the process of this invention, a sheet of steel to form the body portion of a piston ring is integrally welded or brazed to a sheet of an oil-absorbent alloy of non-ferrous metals. The resulting laminated sheet is then cut into strips, which are bent into the usual split piston ring shape. If desired, the strips can be wider than is desired for the width of a piston ring, and these wide strips then upset edgewise to reduce the same to piston ring width, while at the same time, however, increasing the thickness of the strips and also increasing the extent of the area of weld between the welded laminations. The upsetting operation causes the steel portion of the strip to bow into the alloy portion of the strip, thereby presenting a weld area with a curved contour.

In one embodiment of the invention the welding operation is effected in a flash-percussion welding step wherein an electrostatic discharge is passed through the sheets for melting the contiguous surfaces thereof for a minute, almost monomolecular, depth. The molten surfaces, when brought into percussive engagement, will immediately unite to form a good, permanent weld.

If desired, a non-ferrous alloy can merely be melted onto a steel sheet in a reducing or non-oxidizing atmosphere so that the alloy will be brazed to the sheet and will form a layer thereon of any desired thickness.

It is, then, an object of this invention to provide a ferrous metal piston ring having an oil-absorbent alloy layer of appreciable thickness thereon and integrally united therewith.

A further object of this invention is to provide a piston ring composed of steel as the foundation metal and a relatively thick, oil-absorbent alloy layer welded to the outer periphery of the steel to form a self-oiling cylinder-engaging bearing face for the ring.

Another object of this invention is to provide a piston ring composed of a ferrous metal body material and a non-ferrous, oil-absorbent alloy integrally welded thereto and forming the outer periphery thereof.

A further object of this invention is to provide a steel piston ring having an "Oilite" strip welded to the outer periphery thereof to form a cylinder-engaging bearing face for the ring.

Another object of this invention is to provide a process of making piston rings from laminated sheets of metal.

A further object of this invention is to provide a process of making piston rings including the step of laminating sheets of metal of different characteristics by welding operations.

Other and further objects of this invention will become apparent to those skilled in the art from the following detailed description of the annexed sheets of drawings which disclose preferred embodiments of the invention.

On the drawings:

Figure 1 is a fragmentary isometric view of a sheet of steel to form the body of a piston ring according to this invention.

Figure 2 is a fragmentary isometric view of a sheet of non-ferrous oil-absorbent alloy metal for forming the cylinder-engaging element of piston rings according to this invention.

Figure 3 is a side elevational view illustrating the mounting of the sheets shown in Figures 1 and 2 in a flash-percussion welding apparatus to insure a good weld therebetween.

Figure 4 is a view similar to Figure 3 but illustrating the start of the welding operation.

Figure 5 is a view similar to Figures 3 and 4 but illustrating the completion of the welding operation.

Figure 6 is a vertical cross-sectional view taken through the laminated sheets produced by the welding operation illustrated in Figures 3 to 5.

Figure 7 is an isometric view of a piston ring prepared from a strip of the welded sheet shown in Figure 6.

Figure 8 is an electrical diagram illustrating the flash-percussion welding apparatus for welding the sheets together according to the process illustrated in Figures 3 to 5.

Figure 9 is a side elevational diagrammatic view illustrating another method of bonding a non-ferrous alloy layer onto a steel sheet.

Figure 10 is an isometric view of a laminated sheet composed of steel and a non-ferrous alloy bonded thereon.

Figure 11 is a side elevational view of a strip cut from the laminated sheet shown in Figure 10 and illustrating the manner in which the strip is bent into piston ring shape.

Figure 12 is a diagrammatic view of a compressing operation on a wide strip cut from the laminated sheet illustrated in Figure 10.

Figure 13 is a vertical cross-sectional view taken along the line XIII—XIII of Figure 12.

Figure 14 is a vertical cross-sectional view taken along the line XIV—XIV of Figure 7.

As shown on the drawings:

In Figure 1 the reference numeral 10 designates generally a sheet of steel suitable for forming the body portion of a piston ring.

In Figure 2 the reference numeral 11 designates a sheet of oil-absorbent bearing material such as "Oilite." Oilite has the following formula:

| | Percent |
|---|---|
| Copper | 88.5 |
| Tin | 10.0 |
| Graphite | 1.5 |

This alloy will absorb appreciable amounts of oil therein and is self-lubricating due to its graphite content. The sheet 11 can obviously be composed of other oil-absorbent alloys that are used for bearing purposes, such as various bronzes.

In Figure 3 the reference numeral 12 designates one electrode of a flash-percussion welding apparatus. The reference numeral 13 designates the other electrode of the apparatus.

The electrode 12 carries a support 14 for the steel sheet 10. This support 14 has downturned flanges 14a for receiving the sheet 10 thereagainst. The sheet 10 is longer than the interior dimensions of the support 14 so that it is bowed as shown in Figure 3 when inserted in the support.

The electrode 13 carries a flat plate 15 on which is mounted the "Oilite" sheet 11.

In the flash-percussion welding process, the facing surfaces of the sheets 10 and 11 are melted in the almost instantaneous period of time during which these faces are brought together. The speed with which the surfaces are brought into complete area contact is so great that any considerable arcing between the sheets is prevented, thereby avoiding oxidation of the surfaces.

The bowing of the sheet 10 in the support 14 makes possible a contacting of the end of the sheet 11 with the sheet 10 as shown at 16—16 in Figure 4 as the electrodes 12 and 13 are brought together. This effects a good initial contact between the sheets, the area of which is almost instantly increased to the whole area of the sheet 11 during the percussion stroke. The sheet 10 is flattened intermediate its ends, as shown in Figure 5, as the electrodes are brought closer together. Since good contact is provided during the flattening out of the bowed sheet 10, arcing between the sheets is largely prevented.

The end portions 17—17 of the sheet 10 are trimmed flush with the ends of the "Oilite" sheet 11 to form a laminated sheet 18 such as illustrated in Figure 6. The sheet 18 is composed of the sheets 10 and 11 integrally welded together at 19.

In Figure 7 there is illustrated a piston ring 20 formed from a strip cut from the laminated sheet 18. The piston ring 20 has the interior body portion 10a formed of steel from the sheet 10 while the cylinder-engaging face 11a of the piston ring is formed from the alloy of the sheet 11. The thickness of the face layer 11a is satisfactorily of the order of magnitude of $\frac{1}{32}$ inch.

The electrical diagram shown in Figure 8 illustrates the wiring of an apparatus for the flash-percussion welding together of the sheets 10 and 11. This apparatus includes the electrodes 12 and 13 described in Figures 3 to 5.

In Figure 8 the reference numeral 25 designates power lines supplying alternating current to a transformer 26. A half-wave rectifier 27 is provided in the circuit and includes a plate 28 therein receiving current from the transformer 26. The filament 29 of the rectifier is heated by a battery or other source of current 30 in accordance with usual rectifier installation practice. A variable resistor 31 is mounted in the circuit from the rectifier 27 and a variable condenser 32 receives the charge from the rectifier. The other side of the condenser 32 is connected directly with the transformer 26.

The condenser 32 is connected on one side to a variable inductance element 33 and this element, in turn, is connected to the electrode 13. The other side of the condenser 32 is directly connected to the electrode 12.

The flash-percussion weld is accomplished instantaneously by the use of condensers and by discharging a high-frequency current into each of the two pieces to be welded. This frequency is varied for the type of metal to be welded and for the size of the welding area. For example, in welding an area of about two square inches the current used would be approximately 8,000 microfarads, at 4,000 volts and 150,000 amperes. The weld is completed in less than $\frac{1}{1000}$ of a second.

The great speed of the welding operation prevents oxidation. The surfaces of the metal sheets to be welded are melted to almost a monomolecular depth. The weld is probably not over 0.0005" in depth.

In the operation of the circuit illustrated in Figure 8, the condenser 32 is charged for one or two seconds and then discharges its load to the electrodes 12 and 13. The sheets 10 and 11 on these electrodes are charged with the high-frequency current and are brought into contact as shown in Figure 4 with great speed so that the condition illustrated in Figure 5 is reached within $\frac{1}{1000}$ of a second. The sheets are brought together with a percussive force of the order of magnitude of 30,000 lbs. per square inch which causes the molten surfaces of the sheets to form an integral bond therebetween.

In Figure 9 there is illustrated another method of forming a laminated sheet composed of a layer of an oil-absorbent non-ferrous alloy integrally joined with a sheet of steel. As shown in Figure 9 a steel sheet 34 is coated with molten bronze, such as "Oilite" or other suitable bearing metal 35, as by pouring from a spout 36. The molten metal 35 is poured on the steel sheet 34 in a non-oxidizing atmosphere so as to become integrally brazed or welded to the sheet 34, as illustrated at 37. The molten metal 35 solidifies to form a layer of metal 38 on the sheet 34.

In Figure 10 the reference numeral 40 designates generally a laminated sheet formed either by the process illustrated in Figure 9 or by the process illustrated in Figures 3 to 5. This laminated sheet is cut along the dotted lines 41 into a plurality of strips such as 42 shown in Figure 11. The strip 42 is bent, as by a coining operation, into a piston ring 43, as shown in dotted lines in Figure 11.

If desired a strip 42 can be prepared of greater width than is desired for a piston ring but of less thickness than the piston ring thickness. Such strips can then be upset edgewise for decreasing the width and increasing the thickness of the strips. The operation is illustrated in Figure 12, wherein a wide strip 42a composed of a steel layer 44 and an "Oilite" layer 45 is passed between hammers or die heads 46 and 47 to form the strip 48.

As best shown in Figure 13, this strip 48 is composed of the "Oilite" layer 45 and a steel layer 44 with the "Oilite" layer forced into the steel layer in the central portion of the strip. Thus the line or area of weld 49 is curved or bowed in section. The steel layer 44 has a concave face while the "Oilite" layer 45 has a convex face welded to the concave face of the steel layer. This is in contrast with the flat area of weld 19 between the "Oilite" layer 11 and the steel layer 10 of the piston ring 20 shown in Figure 14.

The upsetting operation besides working the metals somewhat to impart desired metallurgical properties thereto, thus increases the extent of the area of weld in the finished piston ring.

It has been found that thin steel sheets are easier to handle in the flash-percussion welding operation and also in the brazing operation illustrated in Figure 9.

If desired the upsetting operation may be effected by the use of pressure rolls instead of by the dies or hammers shown in Figure 12.

It should be understood also that the process steps illustrated in Figures 3 to 5 may be reversed with the "Oilite" sheet seated in the support 14 and the steel sheet seated on the support 15. Likewise the support 15 can be magnetized to attract and hold the sheets 10 and 11 after lamination to insure the removal of the laminated sheet from the support 14.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A piston ring comprising a resilient split steel ring having a non-ferrous oil-absorbent alloy strip welded thereto to form a self-lubricating bearing face thereon, said ring and strip being thickened by an upsetting operation transverse to the weld line therebetween that effects an increase in the area of weld between the strip and ring.

2. The process of making piston rings which comprises bowing a sheet of metal in a support shorter than the sheet, bringing a shorter flat sheet of metal into initial contact with said bowed sheet, effecting an electrostatic discharge through said sheets while said sheets are brought together under a percussion impact to melt the facing surfaces of said sheets and weld said surfaces together, trimming the ends of the initially bowed sheet flush with the ends of said shorter sheet, cutting the laminated sheet into strips and forming said strips into piston rings.

3. A piston ring comprising an inner steel ring member having a concave outer periphery and an outer relatively thick alloy ring composed of copper, tin and graphite having a convex inner periphery welded to the concave outer periphery of the steel ring to form a cylinder-engaging bearing face for the ring, said concave and convex peripheries formed by compressing the metal in a plane transverse to the line of weld.

4. The process of making piston rings which comprises welding a surface layer of metal alloy bearing material onto a broad face of a steel sheet, cutting the resulting laminated sheet into strips of greater width than required for piston rings, upsetting the strips in a plane transverse to the line of weld to flow the steel and alloy into a concavo-convex curve along the weld line thereby simultaneously reducing the strips to the approximate desired width and producing in the upset strips a greater weld area between the alloy and steel than that obtainable in non-upset strips of like width and bending the upset strips into piston ring form.

5. The process of making piston rings which comprises bowing a sheet of metal, bringing a flat sheet of metal into initial contact with said bowed sheet, effecting an electrostatic discharge through said sheets while said sheets are brought together under a percussive impact to melt the facing surfaces of said sheets and weld said surfaces together, cutting the resulting laminated sheet into strips, and forming said strips into piston rings.

6. A piston ring comprising an inner steel band, and an outer metal alloy band welded along its inner face to the outer face of the inner band to form a cylinder-engaging bearing surface, said welded together bands being thickened by an upsetting operation transverse to the weld line therebetween that effects a flowing of the steel and alloy into a concavo-convex curve along the weld line.

ARCHIE T. COLWELL.